D. H. WILSON.
SYSTEM OF ELECTRIC WELDING.
APPLICATION FILED SEPT. 15, 1914. RENEWED MAY 10, 1916.
1,187,406.  Patented June 13, 1916.
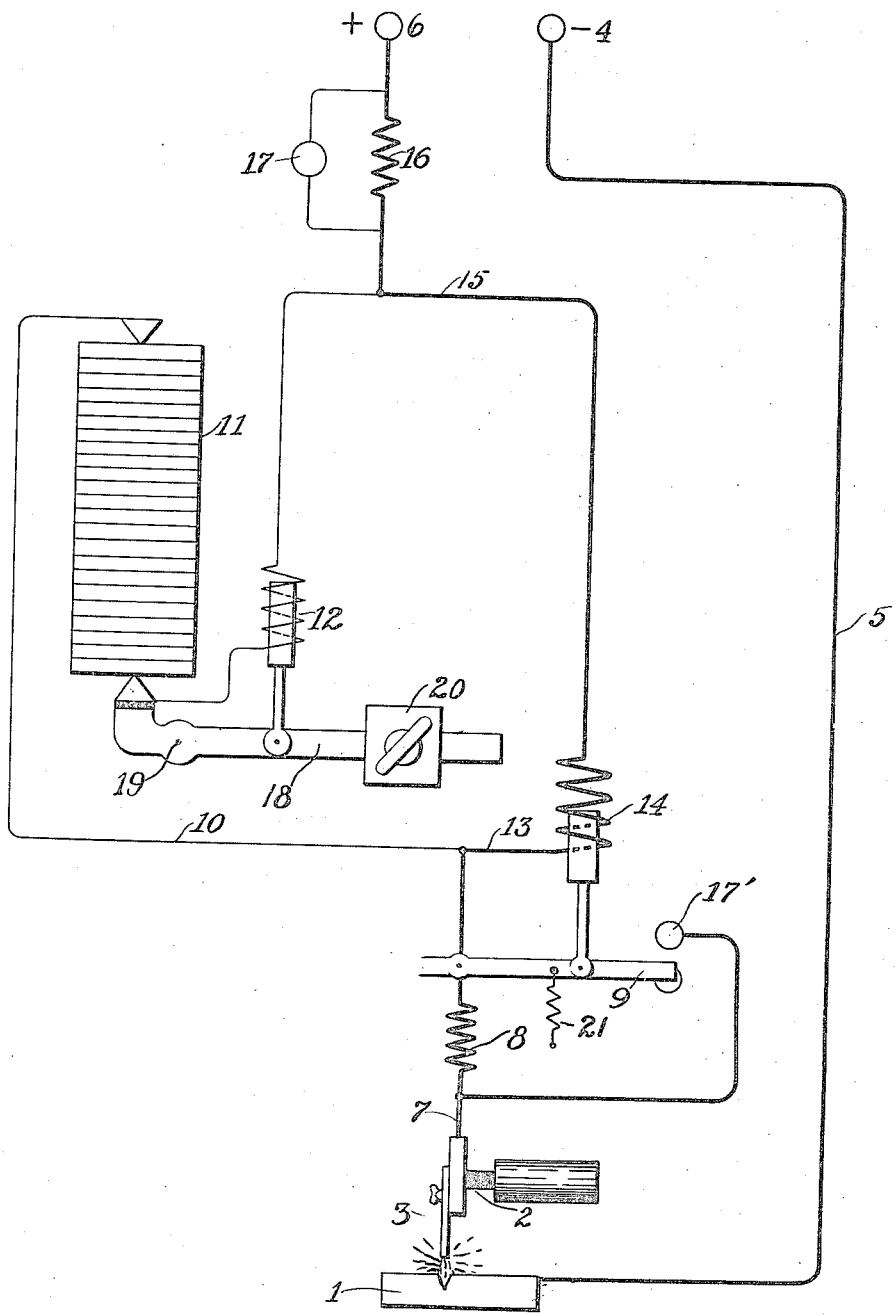
WITNESSES:
INVENTOR
David H. Wilson
BY
Myron F. Hill
ATTORNEY

UNITED STATES PATENT OFFICE.

DAVID H. WILSON, OF PATERSON, NEW JERSEY.

SYSTEM OF ELECTRIC WELDING.

1,187,406.　　　　Specification of Letters Patent.　　Patented June 13, 1916.

Application filed September 15, 1914, Serial No. 861,893. Renewed May 10, 1916. Serial No. 96,535.

*To all whom it may concern:*

Be it known that I, DAVID H. WILSON, citizen of the United States, and resident of Paterson, in the county of Passaic and State of New Jersey, have invented certain new and useful Improvements in the System of Electric Welding, of which the following is a specification.

The object of my invention is a system of circuits and apparatus capable of handling a welding current to enable an operator to electrically weld metals, joints, fractures and otherwise repair or operate upon the same.

Heretofore in electric welding the strength of welded joints has been reduced somewhat by porosity. One of the causes of this feature is lack of regularity and evenness in the welding current itself and one of the chief objects of my invention is to overcome this difficulty by means capable of rendering the current more even and continuous in amount. I accomplish this by means of a resistance adapted to be varied by variations of pressure caused by some electro-responsive device which causes the resistance to vary in inverse proportion to the variations in the resistance of the arc.

A further object is to employ a circuit switch adapted to switch a resistance out of the circuit of the welding tool when the tool is brought into contact with the work and drawn away from the same for the purpose of forming an arc. To properly draw the arc requires upon the part of the operator such skill as to leave the tool in contact with the work for an instant only and quickly to separate the tool from the work as the higher resistance is being switched out of circuit.

In the drawings: the figure shows the circuits and apparatus of my system.

As shown in the drawings the part 1 may be a piece of metal or other work which it is desired to repair or otherwise weld. The operator's tool 2 comprises preferably a pencil of welding metal 3 adapted to supply the metal with which to do the job.

The metal 1 is preferably connected to the negative pole 4 of the source of electricity through the conductor 5. The tool 2 is connected to the positive pole 6 of the source of electricity over the circuits hereinafter described. Before the tool is brought into contact with the work it is connected through the conductor 7, resistance 8 and thence in multiple through two branches, one branch including the conductor 13 and the high resistance circuit closing coil 14; the other through conductor 10, the pile 11, the solenoid 12; thence from these multiple branches through the resistance 16 and meter shunt circuit 17 to the pole 6. This establishes current in coils 12 and 14. The coil 14 causes the switch arm 9 to shift to the contact point 17', thereby short-circuiting the resistance 8. The resistance 8 prevents a rush of current due to the touching of the tool 3 to the work 1 but as it would interfere with the subsequent welding it is necessary to short-circuit it as the tool is being separated from the work to form an arc.

The solenoid coil 12 when energized by the current exerts a pull upon the lever 18 fulcrumed at 19 to offset the weight 20 which exerts normally a pressure upon the carbon pile 11. This pile may be any device which through variable pressure varies the resistance of the circuit. Preferably it includes a series of carbon disks subjected to pressure to maintain electrical contact. The pull of the coil 12 of course varies with the resistance of the arc. As the resistance at the arc increases, the pull of the coil 12 decreases thereby subjecting the pile 11 to gradually increasing pressure thereby reducing its resistance. These parts are so adjusted to each other as to cause the variation of resistance in the pile to vary in inverse proportion to the resistance of the welding arc. As the resistance of the arc decreases, the solenoid 12 increases the resistance of the pile. This operation is gradual and delicately responsive to the variation of the welding tool so as to maintain a more steady and even flow of current through the welding circuit.

It is often desired to vary the amount of current at the arc, in accordance with the demands of the work. Sometimes a thin arc is desired and sometimes a heavy arc is desired, all depending upon the character of work to be done. This variation may be obtained by manually shifting the weight 20 along the lever 18 thereby varying the normal pressure to which the pile 11 is subjected. In other words the normal resistance of the pile may be adjusted from the one stage to another at will subject to manual control and the solenoid is adapted to maintain an even flow of the current at whatever amperage the resistance of the pile may establish.

In operation, the operator touches the pencil or tool 3 to the work 1 whereupon the coil 14 shifts the switch arm 9 to the contact 17 thereby short-circuiting the resistance 8 and the coil 12 exerts a pull upon the lever 18 to increase the resistance of the pile 11 and thereby to vary the resistance to secure an even flow of current. When the arc is broken the original circuits are restored, the spring 21 restoring the arm 9 to an open position.

My invention is not limited specifically to a variable resistance variable by pressure, since any variable resistance device capable of handling the current required for the welding and capable also of smooth variation so as to avoid the introduction into the system of sharply differentiated blocks of resistance, falls within the scope of my invention. Such a device must be capable of sufficiently rapid movement to provide the required compensation for the rapid variations of arc resistance.

Many variations are possible within the scope of my invention. The essence of it is set forth substantially in the following claims.

I claim—

1. In combination, a welding tool adapted to be manually operated to establish and maintain an arc, a source of welding current, a variable resistance variable by pressure and means to regulate the current flowing through the welding circuit to an even amount consisting of an electro-responsive device acting on said variable resistance responding to variations in current flow due to variations in resistance in the welding arc.

2. In combination, a welding tool adapted to be manually operated to establish and maintain an arc, a source of welding current, a variable resistance variable by pressure and means to regulate the current flowing through the welding circuit to an even amount, said regulating means including a solenoid in the welding circuit adapted to vary the said variable resistance.

3. In combination, a welding tool adapted to be manually operated to establish and maintain an arc, a source of welding current and a variable resistance variable by pressure, electro-responsive means located in series with said arc traversed by a substantial portion of the welding current adapted to vary said variable resistance inversely with the arc resistance.

4. In combination, a welding tool adapted to establish and maintain an arc, a source of welding current, a variable resistance variable by pressure, means to vary the current at will, subject to manual control and means associated with said variable resistance to regulate the current flowing through the welding circuit to an even amount.

5. In combination, a welding tool adapted to be manually operated to establish and maintain an arc, a source of welding current, a variable resistance variable by pressure, means to vary the current at will, subject to manual control, consisting of means to exert a desired pressure on said resistance.

6. In combination, a welding tool adapted to be manually operated to establish and maintain an arc, a source of welding current, a variable resistance variable by pressure, means to vary the current at will, subject to manual control, consisting of means to exert a desired pressure on said resistance and means to regulate the current flowing through the welding circuit to an even amount.

7. In combination, a welding tool adapted to be manually operated to establish and maintain an arc, a source of welding current, a variable resistance variable by pressure, means to vary the current at will, subject to manual control, consisting of means to exert a desired pressure on said resistance; and means to regulate the current flowing through the welding circuit to an even amount, including an electro-responsive device responding to variations in current flow due to variations in resistance in the welding arc.

8. In combination, a welding tool adapted to be manually operated to establish and maintain an arc, a source of welding current, a variable resistance variable by pressure and means to regulate the current flowing through the welding circuit at an even amount, consisting of an electro-responsive device responding to variations in current flow due to variations in resistance in the welding arc including an electro-responsive means traversed by a substantial portion of welding current adapted to vary the said variable resistance inversely with the arc resistance, located in series with said arc.

9. In combination, a welding tool adapted to be manually operated to establish and maintain an arc, a source of welding current, a plurality of current branches, including a compensating branch to vary the welding current inversely with the arc resistance including a variable resistance variable by pressure.

10. In combination, a welding tool adapted to be manually operated to establish and maintain an arc, a source of welding current, a plurality of current branches, including a compensating branch to vary the welding current inversely with the arc resistance including a variable resistance variable by pressure; and means to vary the current at will.

11. In combination, a welding tool adapted to be manually operated to establish and maintain an arc, a source of welding current, a plurality of current branches, including a compensating branch to vary the welding current inversely with the arc resistance including a variable resistance variable by pressure; and means to vary the current at will, subject to manual control.

12. In combination, a welding tool adapted to be manually operated to establish and maintain an arc, a source of welding current, a plurality of current branches, including a compensating branch to vary the welding current inversely with the arc resistance including a variable resistance variable by pressure, consisting of an electro-responsive device responding to variations in current flow due to variations in resistance in the welding arc including an electro-responsive means traversed by a substantial portion of welding current adapted to vary said variable resistance inversely with the arc resistance located in series with said arc.

13. In combination, a welding tool adapted to be manually operated to establish and maintain an arc, a source of welding current, a variable resistance variable by pressure, means to vary said resistance and thereby to regulate the current flowing through the welding circuit to an even amount and means to automatically reduce the resistance of the welding current while drawing the arc.

14. In combination, a welding tool adapted to be manually operated to establish and maintain an arc, a source of welding current, a variable resistance variable by pressure, means to vary said resistance and thereby to vary the current at will, subject to manual control, and means to automatically reduce the resistance of the welding current while drawing the arc.

15. In combination, a welding tool adapted to be manually operated to establish and maintain an arc, a source of welding current, a variable resistance variable by pressure, means to vary said resistance and thereby to vary the current at will, subject to manual control, and to regulate the current flowing through the welding circuit to an even amount and means to automatically reduce the resistance of the welding circuit while drawing the arc.

16. In combination, a welding tool carrying a welding metal in circuit with and adapted to be operated in connection with a welding arc, a source of welding current, a variable resistance variable by pressure, and means to regulate the current flowing through the welding circuit to an even amount consisting of an electro-responsive device acting on said variable resistance, responding to variations in current flow due to the variations in resistance in the welding arc.

17. In an electric welding system, two electrodes, one of which is manually operable and adapted to maintain an arc and automatic means to smoothly vary the resistance in said system to substantially compensate for the fluctuations of resistance in said arc.

18. In an electric welding system, two electrodes, one of which is manually operable and adapted to maintain an arc and automatic means to smoothly vary the resistance in said system to substantially compensate for the fluctuations of resistance in said arc, said automatic means being located in series between the welding arc and the source of power.

19. In an electric welding system, two electrodes, one of which is manually operable and adapted to maintain an arc and automatic means to smoothly vary the resistance in said system to substantially compensate for the fluctuations of resistance in said arc, said automatic means being located in series between the welding arc and the source of power and comprising a resistance device capable of variation and electro-responsive means responding to the direct flow therethrough of a substantial portion of the welding current.

Signed at New York in the county of New York and State of New York this 19 day of August A. D. 1914.

DAVID H. WILSON.

Witnesses:
MYRON F. HILL,
GLADYS A. FORD.